No. 781,081. Patented January 31, 1905.

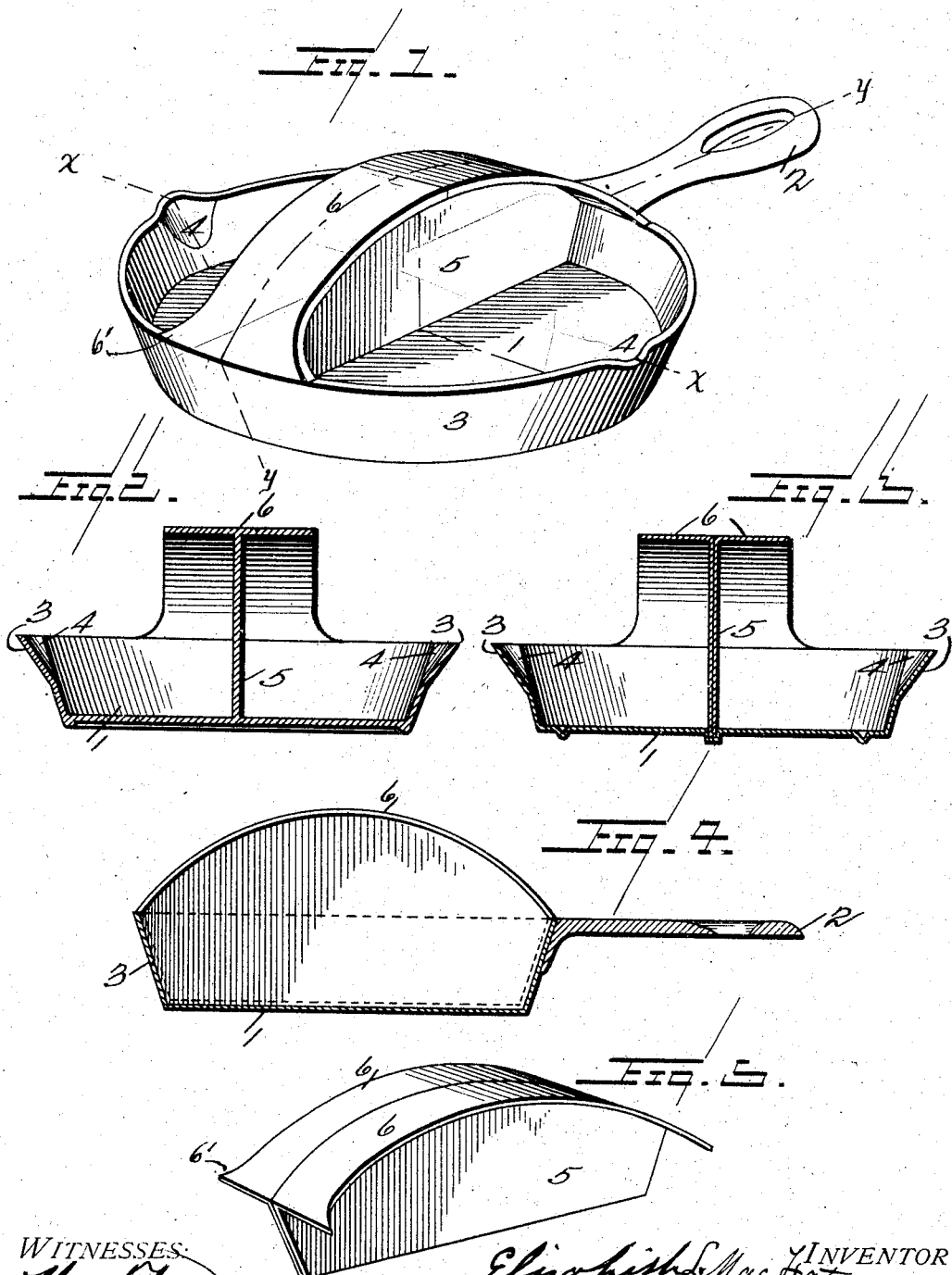

UNITED STATES PATENT OFFICE.

ELIZABETH L. MacFATE, OF WASHINGTON, DISTRICT OF COLUMBIA.

COOKING-PAN.

SPECIFICATION forming part of Letters Patent No. 781,081, dated January 31, 1905.

Application filed October 3, 1903. Serial No. 175,593.

*To all whom it may concern:*

Be it known that I, ELIZABETH L. MACFATE, a citizen of the United States, residing at 1012 North Carolina avenue, southeast, Washington, in the District of Columbia, have invented certain new and useful Improvements in Cooking-Pans, of which the following is a specification.

My invention is a cooking-pan; and it consists in the novel construction and arrangement of its parts. It is primarily intended as a stew-pan or a frying-pan; but it is evident that almost anything can be cooked in it, especially stews. It is so constructed that two different things may be cooked in it at the same time, one on one side of the center partition and one on the other side thereof. The top of the center partition may be arched or straight and extend above the pan and be covered with a flat or an arched bridge flaring at each end. The purpose of the center partition is to keep the two foods being cooked separated, and the purpose of said partition in connection with the flared bridge is when acting conjointly to keep one food from spilling over while the other is being poured out of the lip. There is a handle to the pan on a line with the center partition and two lips in the rim, one on each side of the pan and at right angles to the center partition. One side of the partition and one-half of the bridge has the same or greater holding capacity as one-half of the pan, thereby preventing the contents of either side from spilling while the food in the other is being poured out.

In the accompanying drawings, Figure 1 is a perspective view of my invention. Fig. 2 is a cross-sectional view of Fig. 1 on the line X X and shows a cross-section of the center partition and the bridge when the two are made in one part. Fig. 3 is a cross-sectional view of a modified form of construction, showing the center partition and bridge when made in two parts, also showing feet to the pan. Fig. 4 is a longitudinal sectional view of the pan as shown by the dotted line *y y*, Fig. 1. Fig. 5 is a perspective view of the partition and the bridge when the same are struck out in one piece and bent into shape.

My invention may be all cast in one piece, or it may be made of tin, sheet-iron, or other suitable metal, and may be made in several parts and assembled.

My invention is described as follows: 1 represents the bottom of the pan; 2, the handle; 3, the rim, and 4 the lips, one being on each side of the center partition and at right angles thereto.

5 is the center position, secured to the bottom on the inside of the pan, the ends of which are just as tall as the rim of the pan is deep and rise from each end toward the center in an arch. The ends and lower edge of this center partition are either cast integral with the inner surface of the pan or secured thereto by some means that will stand a great intensity of heat. Extending over the top of said center partition is a curved bridge 6. This curved bridge is flared at each end, as at 6', and is cast integral with the upper edge of the rim of the pan, and the under side of said bridge is cast integral with the curved edge of the center partition, or it may be secured to the parts by some means that will stand a great intensity of heat. It is immaterial just how the pan may be cast or the various parts made and assembled, as my invention consists in the shape of the pan.

Having described my invention, what I claim as new, and desire to secure by Letters Patent, is—

1. A cooking-pan, provided with a handle 2, a center partition 5, secured on the inside and to the bottom of said pan, and on a line with said handle and at each end, to the rim of the pan, said partition at its ends being just as tall as the pan is deep, and rising from each end to the center, forming an arch; a curved bridge covering said center partition, said bridge being flared at each end and united to the top of partition and to the top of said pan, and lips in the rim of said pan at right angles to said partition, substantially as shown and described and for the purposes set forth.

2. A cooking-pan provided with a handle, a center partition secured on the inside to the bottom of said pan and on a line with said handle, and at each end to the rim of the pan; a bridge covering said center partition, said bridge flared at each end and united to the top of said partition and the top of said pan, and lips in the rim of said pan at right angles to said partition, substantially as shown and described and for the purposes set forth.

In testimony whereof I affix my signature in the presence of two witnesses.

ELIZABETH L. MacFATE.

Witnesses:
  I. L. BULLOCK,
  ALSON L. BAILEY.